(12) United States Patent
Nishimura et al.

(10) Patent No.: US 8,472,161 B2
(45) Date of Patent: Jun. 25, 2013

(54) DIELECTRIC CERAMIC COMPOSITION AND TEMPERATURE COMPENSATION LAMINATED CAPACITOR

(75) Inventors: Hitoshi Nishimura, Nagaokakyo (JP); Masahiro Naito, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 128 days.

(21) Appl. No.: 13/050,039

(22) Filed: Mar. 17, 2011

(65) Prior Publication Data

US 2011/0228443 A1    Sep. 22, 2011

(30) Foreign Application Priority Data

Mar. 17, 2010   (JP) .................. 2010-061237

(51) Int. Cl.
    *H01G 4/06*    (2006.01)
    *C04B 35/00*   (2006.01)
(52) U.S. Cl.
    USPC .......... 361/321.1; 501/134; 501/136; 501/137
(58) Field of Classification Search
    USPC ................ 361/321.1–321.5; 501/134, 137, 501/136
    See application file for complete search history.

(56) References Cited

U.S. PATENT DOCUMENTS

| | | |
|---|---|---|
| 2003/0125191 A1 | 7/2003 | Kim et al. |
| 2006/0234854 A1 | 10/2006 | Watanabe et al. |

FOREIGN PATENT DOCUMENTS

| | | |
|---|---|---|
| JP | 10-330163 A | 12/1998 |
| JP | 10335169 A | 12/1998 |
| JP | 2000-128364 A | 5/2000 |
| JP | 2001-294481 A | 10/2001 |
| JP | 2003-212650 A | 7/2003 |
| JP | 2003212650 A * | 7/2003 |
| JP | 2005-246672 A | 9/2003 |
| JP | 2005-213126 A | 8/2005 |
| JP | 2005317776 A | 11/2005 |
| JP | 2006253609 A | 9/2006 |
| JP | 2006-327840 A | 12/2006 |
| KR | 2005-0106439 A | 11/2005 |

OTHER PUBLICATIONS

Japanese Office Action (with English translation) issued for corresponding JP 2010-061237, date Jul. 3, 2012.

* cited by examiner

*Primary Examiner* — Eric Thomas
*Assistant Examiner* — Arun Ramaswamy
(74) *Attorney, Agent, or Firm* — Dickstein Shapiro LLP

(57) ABSTRACT

A dielectric ceramic composition enabling one to obtain a laminated capacitor which hardly causes degradation of insulation resistance with time under high-humidity even in using a base metal such as Ni as an internal electrode, contains as a main constituent, a constituent represented by $(Ca_xSr_{1-x})(Ti_yZr_{1-y})O_3$ in which x and y are $0 \leq x \leq 1$ and $0 \leq y \leq 0.50$, and, as accessory constituents, at least 0.5 parts by mol and at most 15 parts by mol of $SiO_2$, at least 0.1 parts by mol and at most 10 parts by mol of MnO, and at least 0.01 parts by mol and at most 0.079 parts by mol of $Al_2O_3$, with respect to 100 parts by mol of the main constituent.

17 Claims, 3 Drawing Sheets

Sample No. 3

Sample No. 5

DIELECTRIC CERAMIC COMPOSITION AND TEMPERATURE COMPENSATION LAMINATED CAPACITOR

BACKGROUND OF THE INVENTION

1. Field of the Invention

The present invention relates to a dielectric ceramic composition to be used, for example, for a temperature compensation laminated capacitor, and more specifically, to a (CaSr)(TiZr)$O_3$-based dielectric ceramic composition and a temperature compensation laminated capacitor using the ceramic composition.

2. Description of the Related Art

Hitherto, various dielectric ceramic laminated capacitors having an internal electrode composed of a base metal such as Ni or a Ni alloy have been proposed. When a ceramic molded body having a base metal internal electrode is fired in the atmosphere, there is a possibility that the internal electrode is oxidized. Therefore, it is necessary to fire the dielectric ceramic composition ceramic layer and the internal electrode simultaneously in a reducing atmosphere. Accordingly, a nonreducible dielectric material is used as a dielectric material in the laminated capacitors and the like using an internal electrode composed of a base metal.

However, when a thickness of the dielectric layer is decreased, there has been a problem that in the laminated capacitor using the nonreducible dielectric material, that the insulation resistance IR of ceramic is reduced with time and reliability is deteriorated.

In Japanese Unexamined Patent Publication No. 10-335169, there is disclosed, as a material to solve such a problem, a nonreducible dielectric ceramic material containing, as a main constituent, a constituent represented by $[(Ca_xSr_{1-x})O]_m[(Ti_yZr_{1-y})O_2]$ in which X, Y and m satisfy the relationships of $0 \leq X \leq 1$, $0 \leq Y \leq 0.10$ and $0.75 \leq m \leq 1.04$, and, as accessory constituents, MnO in an amount of 0.2 to 5 mol %, $Al_2O_3$ in an amount of 0.1 to 10 mol %, and a constituent represented by $[(Ba_zCa_{1-z})O]_vSiO_2$, in which $0 \leq Z \leq 1$ and $0 \ 0.5 \leq V \leq 4.0$, in an amount of 0.5 to 15 mol %.

SUMMARY OF THE INVENTION

When a temperature compensation laminated capacitor is configured by using the nonreducible dielectric ceramic material described in Japanese Unexamined Patent Publication No. 10-335169 and using a base metal such as Ni as an internal electrode, it is said that the degradation of insulation resistance (IR) with time can be suppressed. However, it was found that when the nonreducible dielectric ceramic material described in Japanese Unexamined Patent Publication No. 10-335169 is used, there is a problem that IR is still reduced over time under high-humidity conditions, as shown in a moisture resistance loading test.

It is an object of the present invention to provide a dielectric ceramic composition which enables one to obtain a laminated capacitor which hardly causes degradation of IR even under high-humidity, that is, a composition is superior in moisture resistance loading life characteristic, and a temperature compensation laminated capacitor using the dielectric ceramic composition.

The dielectric ceramic composition of the present invention contains, as a main constituent, a constituent represented by $(Ca_xSr_{1-x})(Ti_yZr_{1-y})O_3$ in which x and y satisfy the relation of $0 \leq x \leq 1$ and $0 \leq y \leq 0.50$, and, as accessory constituents, at least 0.5 parts by mol and at most 15 parts by mol of $SiO_2$ and at least 0.1 parts by mol and at most 10 parts by mol of MnO, and further at least 0.01 parts by mol and at most 0.079 parts by mol of $Al_2O_3$, with respect to 100 parts by mol of the main constituent. The form of the Mn, Si, and Al after sintering is not limited, and they may exist, for example, at the grain boundaries as metal oxides or dissolved in the crystal grains.

The present inventors have made earnest investigations for suppressing the reduction in IR with time under high-humidity conditions in a laminated capacitor using ceramics obtained by firing a dielectric ceramic composition including a main constituent composed of $(Ca_xSr_{1-x})(Ti_yZr_{1-y})O_3$, and consequently have found that the above-mentioned object can be achieved by mixing $SiO_2$ and MnO in specific amounts with respect to 100 parts by mol of the main constituent, and further mixing $Al_2O_3$ in an amount of at least 0.01 parts by mol and at most 0.079 parts by mol, as described above. These findings have now led to completion of the present invention. The present inventors found that particularly, when $Al_2O_3$, which is believed to have an effect of enhancing reliability, is present in a very small amount of 0.079 parts by mol or less, the moisture resistance loading life can be lengthened. The reason why the degradation of IR due to moisture resistance loading can be suppressed by reducing the amount of $Al_2O_3$ to be mixed as described above is thought to be due to the following reason.

It is believed that the degradation of a grain boundary due to moisture or acid causes the degradation of IR due to moisture resistance loading. That is, the degradation of a grain boundary penetrates into the inside of ceramics and thereby the degradation of IR occurs.

On the other hand, it is known that Al preferentially segregates at a grain boundary than the inside of a ceramic particle. When Al exists at the grain boundary, the degradation at the grain boundary due to moisture resistance loading can be suppressed.

However, if an additive amount of aluminum (Al) is too large, the ceramic is excessively chemically stabilized, and reactivity with a base metal, such as Ni, which is the material for an internal electrode, deteriorates. Therefore, the chemical bonding force at the boundary face between the ceramic and an internal electrode is reduced. Accordingly, peeling easily occurs at the boundary face between the internal electrode composed of a base metal such as Ni and the ceramic. Therefore, it is thought that if an additive amount of aluminum (Al) is too large when the internal electrode is composed of a base metal such as Ni, the effect of peeling at the boundary face between the ceramic and the internal electrode is larger than the effect of suppressing degradation at a grain boundary by virtue of the existence of Al at the grain boundary, and this causes the degradation of IR through moisture resistance loading.

Therefore, it is thought that since the amount of $Al_2O_3$ to be mixed is reduced as described above, such a reduction in chemical bonding force at the boundary face between the ceramics and the internal electrode is suppressed, and this allows the degradation of IR due to moisture resistance loading to be suppressed.

The dielectric ceramic composition of the present invention can be obtained by mixing with the above $SiO_2$ and MnO in the specific amounts in the main constituent, and mixing with the above $Al_2O_3$ in the specific amount. Preferably, the lower limit of the amount of the $Al_2O_3$ is 0.030 parts by mol, and when the $Al_2O_3$ is present in the amount of 0.030 parts by mol or more, the degradation of IR due to moisture resistance loading can be suppressed more effectively. Further, a preferable upper limit of the amount of the $Al_2O_3$ is 0.075 parts by mol, and when the $Al_2O_3$ is present in the amount of 0.075 parts by mol or less, the reduction in IR under high-humidity can be suppressed more effectively.

Further, a preferable upper limit of the amount of the $SiO_2$ is 4.0 parts by mol, and when the $SiO_2$ is present in the amount of 4.0 parts by mol or less, the degradation of IR under high-humidity can be suppressed more effectively. A preferable upper limit of the amount of the MnO is 4.0 parts by mol, and when the MnO is present in the amount of 4.0 parts by mol or less, the degradation of IR under high-humidity can be suppressed more effectively.

In addition, when the molar ratio $(Ca_xSr_{1-x})/(Ti_yZr_{1-y})O_3$ of $(Ca_xSr_{1-x})$ to $(Ti_yZr_{1-y})O_3$ in the composition formula $(Ca_xSr_{1-x})(Ti_yZr_{1-y})O_3$ of the main constituent is denoted by m, m may be 0.9 or more and 1.1 or less, and the molar ratio m does not have to be 1. That is, even if the molar ratio m varies between 0.9 and 1.1, it is possible to achieve the effects of the dielectric ceramic composition of the present invention.

A temperature compensation laminated capacitor of the present invention includes a sintered body made of the dielectric ceramic composition of the present invention and an internal electrode which is disposed in the sintered body and made of a base metal. An embodiment of such a temperature compensation laminated capacitor is shown in FIG. 1. As shown in FIG. 1, a laminated capacitor 1 has a ceramic sintered body 2. A plurality of internal electrodes 3a to 3d made of Ni as a metal are arranged in an overlaid manner with a ceramic portion therebetween in the ceramic sintered body 2. Further, external electrodes 4, 5 are formed so as to cover end faces 2a, 2b of the sintered body 2.

However, the specific structure of the temperature compensation laminated capacitor of the present invention is not limited to the embodiment shown in FIG. 1 and can be appropriately modified.

The temperature compensation laminated capacitor of the present invention can be obtained, for example, by the following production method.

As the main constituent raw materials, $CaCO_3$, $SrCO_2$, $TiO_2$ and $ZrO_2$ are prepared. These main constituent materials are appropriately mixed so as to satisfy the above-mentioned composition of the main constituent.

The production method of the main constituent raw materials is not particularly limited and a solid-phase method or a hydrothermal method may be used. Further, as raw material compounds containing Ca, Sr, Ti or Zr as the main constituent raw materials, not only carbonates and oxides, but also hydroxides may be used. Further, the raw material compound may contain unavoidable impurities such as $HfO_2$.

The main constituent raw material is weighed, and then calcined and milled to obtain a main constituent raw material powder. The accessory constituent raw material powders are mixed to the main constituent raw material powder by an appropriate method such as the wet mixing method. A pre-firing raw material powder is thus prepared. An organic binder and a solvent are added to the raw material powder to obtain a ceramic paste. As the organic binder, appropriate organic binder resins such as ethylcellulose and polyvinyl butyral can be used. Further, appropriate solvents such as acetone, toluene, and terpineol can be used as the solvent.

The raw material powder, the organic binder and the solvent are kneaded to obtain a ceramic paste. The ceramic paste is formed into a sheet by use of an appropriate sheet forming method, such as the doctor blade method to obtain a ceramic green sheet.

Further, the ceramic green sheet and an internal electrode including a base metal-containing conductive paste are stacked according to the well known production method for a laminated capacitor to obtain a laminate. A sintered body can be obtained by firing the laminate.

As the base metal, Ni, Cu or alloys thereof can be used. Preferably, Ni or alloys predominantly composed of Ni can be used. Preparation of a base metal paste can be carried out by the well known method of kneading a base metal powder, an organic vehicle and a solvent.

Further, the sintering of the ceramic laminate and formation of an external electrode can be performed according to the well known production method for a laminated ceramic capacitor.

In the present invention, in addition to the main constituent raw material powder and the accessory constituents, other constituent may be added as long as it does not impair the purpose of the present invention. Examples of such other constituents include oxides of Sc, Y, La, Ce, Pr, Nd, Sm, Eu, Gd, Tb, Dy, Ho, Er, Tm, Yb, Lu, Nb, Mo, Ta, or W.

Since the dielectric ceramic composition of the present invention has the above specific composition, and particularly contains $Al_2O_3$ in an amount of at least 0.01 parts by mol and at most 0.079 parts by mol with respect to 100 parts by mol of the main constituent, the reduction in IR with time under high-humidity can be suppressed effectively, as verified in Examples described later. Accordingly, it becomes possible to provide a temperature compensation laminated capacitor which is superior in moisture resistance loading characteristic by using the dielectric ceramic composition of the present invention.

DETAILED DESCRIPTION OF THE INVENTION

Figure 1:
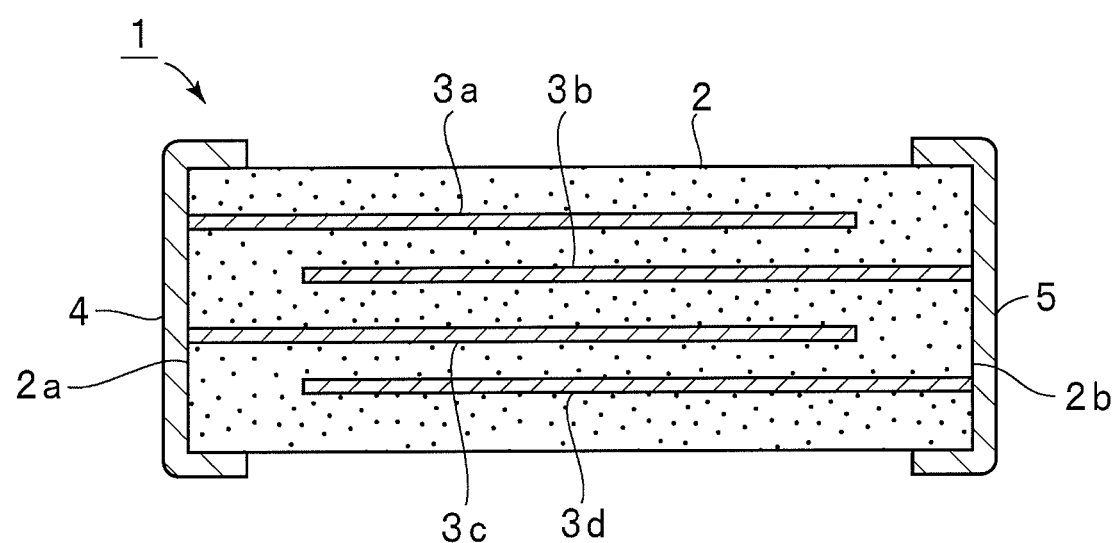
FIG. 1 is a schematic front sectional view for illustrating a temperature compensation laminated capacitor of an embodiment of the present invention.

Hereinafter, effects of the present invention will be explained by way of specific examples.

As main constituent raw materials, the respective powders of $CaCO_3$, $SrCO_3$, $TiO_2$ and $ZrO_2$, with a purity of 99% or more, were prepared. These powders were weighed so as to realize the composition shown in the following Table 1. Thereafter, the weighed powders were wet mixed using a ball mill, and the resulting mixture was dried and then pulverized. The powder obtained by pulverization was calcined at a temperature of 900° C. to 1300° C. and pulverized again to obtain a main constituent raw material powder.

As accessory constituent raw materials, a $SiO_2$ powder, a MnO powder and an $Al_2O_3$ powder were prepared. The main constituent raw material powders obtained as described above and these accessory constituent raw material powders were weighed in such a way that these accessory constituent raw material powders are present in the mol amounts shown in the following Table 1 with respect to the main constituent raw material powder, and the respective powders were wet mixed using a ball mill. Next, the resulting mixture was dried and pulverized to obtain a raw material powder. To 100 parts by weight of the obtained raw material powder, 10 parts by weight of a polyvinyl butyral-based binder and toluene as a solvent were added, and the resulting mixture was wet mixed using a ball mill to prepare a ceramic slurry. The resulting ceramic slurry was formed into a sheet by the doctor blade method to obtain a 15-square-centimeter ceramic green sheet having a thickness of about 6 μm.

A Ni paste was printed on the ceramic green sheet to form a Ni paste layer for an internal electrode. As the Ni paste, one containing 100 parts by weight of a Ni powder as a metal powder, 7 parts by weight of ethylcellulose as an organic vehicle and a compound containing terpineol as a solvent was used.

A plurality of ceramic green sheets on which the above conductive paste layer was formed, were stacked in such a way that ends to which the conductive paste layer was drawn, were alternately inversely oriented and formed into a stack between plain ceramic green sheets, i.e., not having any conductive paste layers. Thus, a laminate was obtained. The laminate was heated to 200 to 800° C. in the atmosphere to burn off the binder resin, and thereafter the temperature of the laminate was raised to a maximum temperature of 1200° C. at a temperature raising rate of 10° C./min, and the laminate was fired in a reducing atmosphere. Thereby, a ceramic sintered body was obtained.

The ceramic sintered body was subjected to barrel finishing to expose internal electrodes formed at end faces of the ceramic sintered body. A Cu paste was applied to both end faces of the ceramic sintered body and baked at a temperature of 800° C. in a nitrogen atmosphere. Thus, external electrodes were formed on both end faces of the ceramic sintered body. Thereafter, a Ni-plated layer and a Sn-plated layer were in order formed on the external electrode by the barrel plating method. Thus, a laminated capacitor of 1.2 mm in width×2.0 mm in length×0.6 mm in thickness, in which the thickness of the ceramic layer between internal electrodes is 5 μm, was obtained. The number of the ceramic layers between the internal electrodes was set at 100.

The laminated capacitors of sample Nos. 1 to 24 in Table 1 thus obtained were evaluated according to the following procedure.

Heat Moisture Resistance Loading Test: The heat moisture resistance loading test was performed on 100 samples under the conditions of a temperature of 121° C., a humidity of 100% RH, 2 atmospheric pressure and an applied voltage of 50 V. After a lapse of 250 hours, the insulation resistance (IR) was measured. A sample having an IR (Ω) value of $10^6$ or less was considered as a defective in the moisture resistance loading life. The number of defectives per 100 samples of each sample No. is shown as the evaluation result of the moisture resistance loading life in the following Table 1.

In addition, sample Nos. 5, 6, and 10 in Table 1 are samples out of the scope of the present invention.

Figure 2:
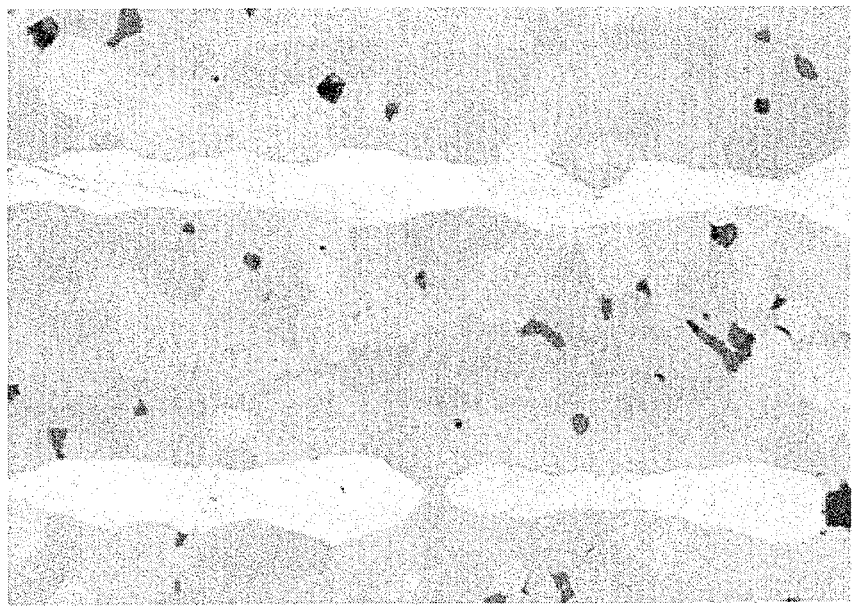
FIG. 2 is an electron micrograph showing a peripheral portion of an internal electrode after a heat moisture resistance loading test using sample No. 3 as an example of the present invention.
Figure 3:
FIG. 3 is an electron micrograph showing a peripheral portion of an internal electrode after a heat moisture resistance loading test using sample No. 5 which is a sample out of the scope of the present invention.

Further, as a typical examples, electron micrographs of a peripheral portion of the internal electrode after a heat moisture resistance loading test of sample No. 3 and sample No. 5 are shown in FIGS. 2 and 3, respectively.

TABLE 1

| | $(Ca_xSr_{1-x})(Ti_yZr_{1-y})O_3$ | | | | | Moisture Resistance Loading Life |
|---|---|---|---|---|---|---|
| Sample No. | x | y | $SiO_2$ | MnO | $Al_2O_3$ | |
| 1 | 0.99 | 0.01 | 2.0 | 2.0 | 0.010 | 5/100 |
| 2 | 0.99 | 0.01 | 2.0 | 2.0 | 0.030 | 1/100 |
| 3 | 0.99 | 0.01 | 2.0 | 2.0 | 0.050 | 0/100 |
| 4 | 0.99 | 0.01 | 2.0 | 2.0 | 0.070 | 2/100 |
| *5 | 0.99 | 0.01 | 2.0 | 2.0 | 0 | 43/100 |
| *6 | 0.99 | 0.01 | 2.0 | 2.0 | 0.005 | 38/100 |
| 7 | 0.99 | 0.01 | 1.8 | 2.0 | 0.075 | 0/100 |
| 8 | 0.99 | 0.01 | 1.8 | 2.0 | 0.077 | 1/100 |
| 9 | 0.99 | 0.01 | 1.8 | 2.0 | 0.079 | 2/100 |
| *10 | 0.99 | 0.01 | 1.8 | 2.0 | 0.080 | 30/100 |
| 11 | 0.99 | 0.01 | 3.0 | 3.0 | 0.075 | 0/100 |
| 12 | 0.99 | 0.01 | 4.0 | 4.0 | 0.075 | 0/100 |
| 13 | 0.99 | 0.01 | 3.0 | 2.0 | 0.075 | 1/100 |
| 14 | 0.99 | 0.01 | 3.5 | 4.0 | 0.075 | 0/100 |
| 15 | 0.99 | 0.01 | 1.0 | 0.5 | 0.075 | 2/100 |
| 16 | 0.99 | 0.01 | 1.0 | 0.1 | 0.075 | 2/100 |
| 17 | 0.99 | 0.01 | 0.5 | 0.5 | 0.075 | 0/100 |
| 18 | 0.99 | 0.01 | 12.0 | 9.0 | 0.075 | 3/100 |
| 19 | 0.99 | 0.01 | 15.0 | 10.0 | 0.075 | 4/100 |
| 20 | 1.00 | 0.01 | 2.5 | 2.0 | 0.075 | 0/100 |
| 21 | 0.99 | 0.50 | 2.5 | 2.0 | 0.075 | 2/100 |
| 22 | 0.50 | 0.05 | 2.5 | 2.3 | 0.075 | 1/100 |
| 23 | 0 | 0.05 | 2.5 | 2.3 | 0.075 | 1/100 |
| 24 | 1.00 | 0 | 2.5 | 2.3 | 0.075 | 1/100 |

In sample No. 5 containing no $Al_2O_3$, there were forty-three defectives of 100 samples in the moisture resistance loading life test, and in sample No. 6 containing only 0.005 parts by mol of $Al_2O_3$, thirty-eight defectives of 100 samples were found in the moisture resistance loading life test. In fact, as shown in FIG. 3, it is found that peeling occurs around the internal electrode in sample No. 5.

In sample No. 10, the amount of $Al_2O_3$ was 0.080 parts by mol, and thirty defectives in the 100 samples were found.

On the other hand, since the other sample Nos. 1 to 4, 7 to 9, and 11 to 24 were dielectric ceramic compositions having the composition within the range of the present invention, the number of defectives of 100 samples was significantly small, being 5 or less, in the moisture resistance loading life test. Further, as is apparent from an electron micrograph of a peripheral portion of the internal electrode of sample No. 3 in FIG. 2, peeling does not occur around the internal electrode. Therefore, it is evident from the results of sample Nos. 1 to 4, 7 to 9 and 11 to 24 that when the dielectric ceramic composition of the present invention is used, the degradation of IR under high-humidity can be suppressed with certainty.

Particularly in sample Nos. 2 to 4, 7 to 9, 11 to 17, and 20 to 24, in which the amount of $Al_2O_3$ to be mixed was 0.030 parts by mol or more, the number of defectives to be caused was much less than that of sample No. 1. Therefore, it is evident that the amount of $Al_2O_3$ to be mixed is preferably 0.030 parts by mol or more.

Further, three defectives in 100 samples and four defectives in 100 samples were respectively found in sample Nos. 18 and 19, and the reason for this is thought to be that the amounts of $SiO_2$ and MnO are slightly high. That is, when sample Nos. 2 to 4, 7 to 9, 11 to 17, and 20 to 24, in which the amounts of $SiO_2$ and MnO were respectively 4.0 parts by mol and 4.0 parts by mol or less, were used, the number of the defectives in the moisture resistance loading life test was less than those in sample Nos. 18 and 19. Therefore, it is evident that the amounts of $SiO_2$ and MnO to be mixed are preferably 4.0 parts by mol or less.

What is claimed is:

1. A dielectric ceramic composition comprising,
a constituent represented by $(Ca_xSr_{1-x})(Ti_yZr_{1-y})O_3$ in which $0 \leqq x \leqq 1$ and $0 \leqq y \leqq 0.50$ as a main constituent, and,
as accessory constituents, at least 0.5 parts by mol and at most 15 parts by mol of $SiO_2$, at least 0.1 parts by mol and at most 10 parts by mol of MnO, and at least 0.030 parts by mol and at most 0.079 parts by mol of $Al_2O_3$, with respect to 100 parts by mol of the main constituent.

2. A dielectric ceramic composition according to claim 1 in which the amount of $SiO_2$ and MnO are each at most 4 parts by mol.

3. A dielectric ceramic composition according to claim 2 in which $0.5 \leqq x \leqq 0.99$, $0.1 \leqq y$, the amount of $SiO_2$ is 1.8 to 3.5 parts by mol and the amount of MnO is 0.5 to 3 parts by mol.

4. A dielectric ceramic composition according to claim 1 in which the amount of $SiO_2$ and MnO are each at most 4 parts by mol.

5. A dielectric ceramic composition according to claim 4 in which $0.5 \leqq x \leqq 0.99$, $0.1 \leqq y$, the amount of $SiO_2$ is 1.8 to 3.5 parts by mol and the amount of MnO is 0.5 to 3 parts by mol.

6. A temperature compensation laminated capacitor comprising a sintered body comprising the dielectric ceramic composition according to claim 5 sandwiched between internal electrodes comprising a base metal.

7. A temperature compensation laminated capacitor according to claim 6 in which the base metal comprises nickel.

8. A temperature compensation laminated capacitor comprising a sintered body comprising the dielectric ceramic composition according to claim 4 sandwiched between internal electrodes comprising a base metal.

9. A temperature compensation laminated capacitor according to claim 8 in which the base metal comprises nickel.

10. A temperature compensation laminated capacitor comprising a sintered body comprising the dielectric ceramic composition according to claim 3 sandwiched between internal electrodes comprising a base metal.

11. A temperature compensation laminated capacitor according to claim 10 in which the base metal comprises nickel.

12. A temperature compensation laminated capacitor comprising a sintered body comprising the dielectric ceramic composition according to claim 2 sandwiched between internal electrodes comprising a base metal.

13. A temperature compensation laminated capacitor according to claim 12 in which the base metal comprises nickel.

14. A temperature compensation laminated capacitor comprising a sintered body comprising the dielectric ceramic composition according to claim 1 sandwiched between internal electrodes comprising a base metal.

15. A temperature compensation laminated capacitor according to claim 14 in which the base metal comprises nickel.

16. A temperature compensation laminated capacitor according to claim 15 comprising a plurality of dielectric ceramic compositions sandwiched between internal electrodes.

17. A temperature compensation laminated capacitor according to claim 16 having a pair of external electrodes disposed at spaced positions on an external surface of the capacitor, and each external electrode is electrically connected to a different internal electrode.

* * * * *